(12) United States Patent
Pinkney (10) Patent No.: US 8,670,477 B2
(45) Date of Patent: Mar. 11, 2014

(54) SYSTEM AND APPARATUS FOR DETECTING INTERFERENCE IN RADIO BANDS

(75) Inventor: John Pinkney, Calgary (CA)

(73) Assignee: Myotis Wireless, Inc., Calgary, Alberta (CA)

(*) Notice: Subject to any disclaimer, the term of this patent is extended or adjusted under 35 U.S.C. 154(b) by 623 days.

(21) Appl. No.: 12/768,520

(22) Filed: Apr. 27, 2010

(65) Prior Publication Data

US 2010/0272153 A1  Oct. 28, 2010

Related U.S. Application Data

(60) Provisional application No. 61/172,879, filed on Apr. 27, 2009.

(51) Int. Cl.
 *H04B 1/00* (2006.01)
(52) U.S. Cl.
 USPC ............................................ 375/139; 375/141
(58) Field of Classification Search
 USPC .......... 375/259, 219–222, 354–358, 139, 141
 See application file for complete search history.

(56) References Cited

U.S. PATENT DOCUMENTS

| | | | | |
|---|---|---|---|---|
| 4,037,159 A * | 7/1977 | Martin | | 375/343 |
| 4,300,161 A * | 11/1981 | Haskell | | 348/385.1 |
| 4,418,393 A * | 11/1983 | Zscheile, Jr. | | 708/314 |
| 5,341,423 A * | 8/1994 | Nossen | | 380/252 |
| 6,275,544 B1 * | 8/2001 | Aiello et al. | | 375/326 |
| 6,614,853 B1 * | 9/2003 | Koslar et al. | | 375/271 |
| 6,667,966 B2 * | 12/2003 | Mitsume et al. | | 370/350 |
| 6,940,893 B1 | 9/2005 | Pinkney et al. | | |
| 6,978,149 B1 * | 12/2005 | Morelli et al. | | 455/522 |
| 7,925,224 B2 | 4/2011 | Pinkney | | |
| 8,170,138 B2 | 5/2012 | Pinkney | | |
| 2002/0039888 A1 * | 4/2002 | Hama | | 455/63 |
| 2003/0185228 A1 * | 10/2003 | Buda et al. | | 370/442 |
| 2004/0001532 A1 * | 1/2004 | Mason et al. | | 375/136 |
| 2005/0157740 A1 | 7/2005 | Sato | | |
| 2006/0017566 A1 * | 1/2006 | Gauvreau et al. | | 340/541 |
| 2007/0165740 A1 * | 7/2007 | Koslar et al. | | 375/271 |
| 2008/0285684 A1 * | 11/2008 | Shen et al. | | 375/324 |
| 2009/0262877 A1 * | 10/2009 | Shi et al. | | 375/376 |
| 2009/0316834 A1 * | 12/2009 | Shin et al. | | 375/319 |

OTHER PUBLICATIONS

Colin K. Campbell, Understanding Surface Acoustic Wave (SAW) Devices for Mobile and Wireless Applications and Design Techniques, Session 19: "An Overview of SAW Devices for Mobile/Wireless Communications", 68 Questions and Answers for Year 2008, 2008.

* cited by examiner

*Primary Examiner* — Emmanuel Bayard (57) ABSTRACT

An apparatus and technique for measuring and coping with interfering signals in a wireless communications system. The apparatus and technique rapidly and regularly measures the signals present in the wireless communication system's band of operation. The apparatus and technique then makes this information available to all the transceivers on the network, so that each transceiver has information the interference other transceivers see, and the system can make intelligent decisions about radio transmission parameters to optimize the network performance.

33 Claims, 5 Drawing Sheets

SYSTEM AND APPARATUS FOR DETECTING INTERFERENCE IN RADIO BANDS

CROSS-REFERENCE TO RELATED APPLICATIONS

This application claims the benefit under 35 USC 119(e) of U.S. application No. 61/172,879 filed Apr. 27, 2009, the content of which is hereby incorporated by reference.

FIELD

Telecommunications Systems.

BACKGROUND

With the large growth in the use of wireless devices, in particular those devices which operate in the unlicensed frequency bands, a demand is being created for radios which are able to identify and cope with other, potentially hostile, signals which also operate in those bands. The goal is not only to allow a particular radio to communicate successfully in the presence of interference, but also to minimize the effect of radio's own transmissions has on other systems which are operating in the same band.

This is a very difficult goal to achieve when one considers that in unlicensed bands radios can transmit intermittently, and in the case of frequency hopping radios, also exhibit dynamic behavior by constantly changing their frequency of operation over time. Throw mobility into the mix, and what you have are widely varying power levels for various interferers seen by a particular radio operating at a constant point in space over time. Thus the licensed radio paradigm, where a system sets up a wireless network at some known frequency and stays on that frequency for the duration of its operation, will just not work in unlicensed radio bands.

Various schemes exist for coping with varying interference levels, most notably Frequency Hopping Spread Spectrum (FHSS), which is widely in use. In FHSS systems, the frequency of operation is changed regularly according to some random pattern. FHSS was originally designed to be an anti jamming mechanism—it does mitigate the effects of interfering signals on average over time—the random (essentially blind) nature of the choice of centre frequency, and the regularity of the hopping does limit its performance. While over time, the effects of interference are mitigated, during any single hop the link may not function. The duration of a single hop can be in the hundreds of milliseconds, which, for a high-speed communications system, is a large number of bits. During a single hop, the radio link could be inoperable depending on what the interference is doing at the time. Whether or not a particular hop frequency will permit the system to operate is also largely unknown, since interferers can be intermittent and change their centre frequency. This leads to radio "dead spots" with FHSS, where no data is being received while the system is waiting to hop to a different frequency.

Examples of systems exist in the prior art which use frequency information to optimize their transmission. One method which is particularly common to systems which regularly change their centre frequency (called Frequency Hopping Spread Spectrum, or FHSS) is to test each channel's integrity by sending data on the channel's centre frequency. If relatively error-free data is received, then that channel is deemed as a "good" channel for transmission. If many errors are seen, or data cannot get through at all on that channel, then that channel is flagged as a "bad" channel. A table is kept of channels which are "good" and "bad", so that only the ones which have been proven "good" may be used.

This method has inherent drawbacks, however, since it not only relies on a radio which changes its centre frequency often and regularly (and is thus suitable only for FHSS systems), but it also uses the actual data transmission as the benchmark for channel quality. For this system to work, data must be periodically transmitted over "bad" channels where communications will be degraded or interrupted. Channels must also be regularly re-tested, which can contribute to communications interruption. Such a system is also unable to determine what, exactly is causing the data interruption, so that degradations caused by interference cannot be differentiated from channel effects, system delays, power interruptions, etc.

Another method which can be used by fixed-frequency systems is a technique called collision avoidance, where the system listens for other signals on the channel it is using, and if it detects a large amount of traffic, uses another channel. In such a scheme, only radios using the same protocol as the radio testing the channel can be detected. Other interferers and physical effects of the channel cannot be detected with this method.

Another passive method which can be used to detect interfering signals is to use a Received Signal Strength Indicator (RSSI) which already exists on the radio for Automatic Gain Control functions. The radio waits for a dead period in between transmissions and uses the RSSI to measure the power coming in from the channel. If that power is above a certain threshold, the channel is deemed as having too much interference and another channel is used. While this method is simple and fast, it provides no information about the nature of the power being detected.

It is possible to produce a frequency scan of the band of operation without having to "test" the channel, using Fourier Transform techniques. Creating a Fourier Transform of the entire band gives detailed information about not only the signals in the band, but also the behavior of the radio channel. Unfortunately quite a bit of extra hardware has to be added to a conventional communications system to achieve this, which increases the complexity, power consumption, and cost. In effect, you would be adding the capability of a spectrum analyzer to the radio, which in many applications (particularly low power ones) is impractical.

What is needed for a radio to function reliably in an unlicensed band is a scheme which allows it to measure the properties of all the interfering signals on the band quickly and accurately and use this information to make intelligent decisions about its own frequency of operation, transmission time periods, and other factors. These decisions could allow the radio to transmit more reliably than if it "blindly" chose its centre frequency, or waited for the loss of its own data link to do something about the interference.

SUMMARY

An apparatus and technique is provided in an embodiment for constructing a radio which is capable of obtaining detailed information about the centre frequencies, occupied bandwidth, and other characteristics of signals which exist in a communications system's band of operation. Using the apparatus and technique outlined here, the radio can obtain detailed information about the channel it operates upon, and thereby improve its performance.

A secondary objective of an embodiment of the apparatus and technique is to provide information about the band of operation to the entire communications system (i.e. every transceiver in the network), allowing every transceiver to make decisions about the band of operation and its interfering signals in order to optimize the link performance.

A further function of an embodiment of the apparatus and technique is to obtain a detailed scan of the channel of operation and signals which exist on that channel in a very short period of time. Such systems already exist, however they are much more cumbersome and power-hungry than the apparatus presented here. Such techniques usually involve high-speed digital-to-analog conversion and digital frequency analysis (such as the Fast Fourier Transform) which require a great deal of system resources (i.e. power and complexity). Such techniques can be used in complex networks (such as cellular systems) which have fixed base stations, large amounts of power, and are planned and set up in advance. For the low-power, low-complexity radio systems which exist in unlicensed bands, however, such techniques are impractical.

Preferably, the channel scan information occurs at a high enough rate that dynamic radio standards that exist in the unlicensed bands such as Frequency Hopping Spread Spectrum (FHSS) and 802.11 (sometimes called Wi-Fi) can be resolved and their characteristics revealed. If the scan is fast enough, and done at a high enough rate of repeatability (once every few packets) then a regular "snap shot" of the band of operation can be obtained.

Preferably, the frequency information is captured with an Analog-to-Digital converter (ADC) to enhance scanning speed. In an embodiment, we propose using an analog dispersive filter (sometimes called a chirp filter) for this function. Chirp filters are characterized by their well-behaved group delay over their band of operation. A common type of chirp filter is known as a linear chirp filter, because the group delay function is a straight line. For such a filter, the group delay is expressed by a linear relationship $$G_d(f) = m_c f + d_o$$

where $G_d(f)$ is the group delay for a particular frequency in seconds, $\mu_c$ is the delay slope of the dispersive filter (in seconds/Hz), f is a particular frequency and $d_o$ is the delay through the filter of the lowest frequency. From the above equation, it can be seen that if a signal consisting of multiple simultaneous frequency components is passed through this filter, each of the frequency components will be delayed by a specific amount. If time samples of the dispersed signal are taken at specific intervals, then the frequency of the signal at any time can be determined by the relationship shown above. This is the dispersive nature of a dispersive filter and is a very efficient (and rapid) method of converting a signal from the frequency to the time domain.

One well-known method in the art of building a dispersive filter is by using so-called Surface Acoustic Wave (SAW) design techniques. In a SAW filter, electrical signals are converted first to acoustic signals and launched across a piezoelectric substrate. After the acoustic signals have traveled some distance, they are converted back to electrical signals. It is the fact that the acoustic signals travel at a speed many orders of magnitude slower than the electrical signals that allows dispersive filters to be constructed using this technique. Delays on the order of tens of microseconds (which is well within the sampling time of modern low-power high speed ADCs) are achievable using this technique. For example, a typical SAW filter with a bandwidth of 20 MHz and a total delay of 5 microseconds paired with an ADC with a sample rate of 25 ns gives a resolution of 100 KHz per sample of the input signal. Therefore, in an embodiment, use of a SAW filter is proposed for the dispersive filter.

While the dispersive filter will spread the frequency components of any signal applied to it according to the relationship shown above, since the filter is an analog device it does not distinguish between the signal components at one time interval, and those at another time interval. Thus if a continuous signal were fed into its input, the signal seen at the output at any particular sample time would consist of many frequency components. For example, if a continuous signal x(t) is applied at the input of the dispersive filter, at any particular sample time $t_n$, the output y(t) would consist of $$y(t_n) = \ldots f_{n-2} + f_{n-1} + f_n + f_{n+1} + f_{n+2} \ldots$$

This equation represents the desired signal, $f_n$, plus the addition of undesired frequency components, $f_{n-1}$, $f_{n-1}$, etc, which occur at earlier (and later) time periods but have to same total delay as the desired frequency component. This can be thought of as a form of aliasing. The best way around this problem is to shorten the duration of the input signal to a single sample, so that the other frequency components, $f_{n-1}$, $f_{n-1}$, etc, are eliminated.

One way to accomplish this duration shortening (or duty cycling as it is often called) is to place a switch at the input of the dispersive filter and use this switch to send a very short pulse of the signal into the dispersive filter. As long as the duration of the pulse is close to the sample time of the analog-to-digital converter, this will eliminate the overlapping frequency components. During the result of the channel sampling sequence, the switch will be off, thus blocking the signal from entering the dispersive filter.

The signal seen at the output of the dispersive filter is a collection of different signals with different frequency components spaced out in an orderly fashion over some time period. The signal outputs will vary in frequency during the duration of the channel sampling sequence according to the dispersive filter's group delay. In addition, the dispersive filter will typically not function at baseband (i.e. with its lowest frequency being 0 Hz), rather over some range of intermediate frequencies (IFs). This means the signals coming out of the filter can be much higher in frequency than the bandwidth of the ADC. Since the frequency versus time response of the dispersive filter is well known, all that is needed is the power level of the filter output versus time.

Rather than worry about demodulating the dispersive filter output, a much more effective technique is to use an envelope detector (one circuit known in the art is called a Received Signal Strength Indicator or RSSI circuit) to produce a voltage which is proportional to the power of the signal. It is then incumbent upon the ADC to simply read this voltage. The relationship between the voltage and the sample time is proportional to the relationship between input frequency of the signal and its power.

One important byproduct of duty cycling the input signal is a large reduction in the energy of the signal seen at the output of the dispersive filter. This is because energy is a function of signal strength and signal duration. To add to this problem, the signal seen at the output of the dispersive filter will also be attenuated by the filter itself, since, in the case of SAW filters, there is a considerable insertion loss in these devices.

If the ADC is to detect signals imbedded in the short-duration input to the dispersive filter, then the gain at the input to the filter should be increased by an amount at least equal to the insertion loss of the filter, and the energy reduction due to the shortening of the input pulse. This may be necessary to ensure that the interfering signals have a high enough amplitude to be detected at the output of the dispersive filter above the ambient noise. This increase in gain would have to be triggered at the appropriate time (i.e. when the radio receiver is performing an interference scan, rather than demodulating data). The amount of gain increase can be calculated using the following formula: $G_{Rx}$ (dB)=$L_{DF}$ (dB)+10 log [$t_{DF}/t_{DC}$] where $G_{Rx}$ is the required increase in gain of the receiver during the channel scan (in dB), $L_{DF}$ is the insertion loss through the dispersive filter (in dB), $t_{DF}$ is the total delay time of the dispersive filter (in seconds) and $t_{DC}$ is the duty cycled duration of the input signal.

In a further embodiment, scanning a frequency band is provided in which the frequency band which is larger than the bandwidth of the dispersive filter. This may be done by performing multiple scans, where each scan has a different receiver front-end Local Oscillator (LO) frequency. The LO frequencies are chosen so that the scans overlap slightly on the band edges. Once the entire frequency band is covered, the data may be combined to produce a larger bandwidth scan than could be produced with a single scan.

Since the signals being detected are in the band of operation of the communications system, one important aspect of an embodiment of what is disclosed here is to coordinate the communications system such that when the sampling of the signal occurs no data is being transmitted over the communications link. There may be provisions in the network for the coordination between all transceivers for a common time period when there will be no transmission and a channel sample can be taken by each of the transceivers.

These and other aspects of the device and method are set out in the claims, which are incorporated here by reference.

BRIEF DESCRIPTION OF THE DRAWINGS

There will now be described preferred embodiments with reference to the drawings, by way of example, in which like reference characters denote like elements, and in which.

DETAILED DESCRIPTION

In the disclosed embodiments, there is provided a wireless communications system comprising a transmitter and receiver in which the receiver periodically scans the band of operation to produce a representation of the frequency spectrum of the band of operation and conveys this information back to the transmitter and the transmitter uses this information to make decisions about the nature of the communications link. The receiver and transmitter may be synchronized so that the transmitter stops transmitting its signal when the receiver is scanning the band of operation. The receiver may scan both inside and outside its current channel of operation to produce a frequency spectrum covering a larger band than just its band of operation. The receiver may use an analog switch, a dispersive (i.e. chirp) filter, followed by an envelope detector to produce a frequency spectrum of the received signal. The band of operation of the dispersive filter may be smaller than the entire band of operation of the system, and the frequency scan consists of multiple frequency scans each with a different centre frequency. The information carrying signal in the communications system may include a chirp signal. The local representation of the frequency spectrum may be seen by each of a number of transceivers in a communications system, and the other transceivers may use this information to make decisions about the configuration of the communications network. All the transceivers in the system may be synchronized, so that no transceiver is transmitting a signal when all the transceivers are scanning the band of operation. The transceivers may scan outside of each of their current channels of operation to produce a frequency spectrum covering a larger band than just their individual bands of operation.

Figure 1:
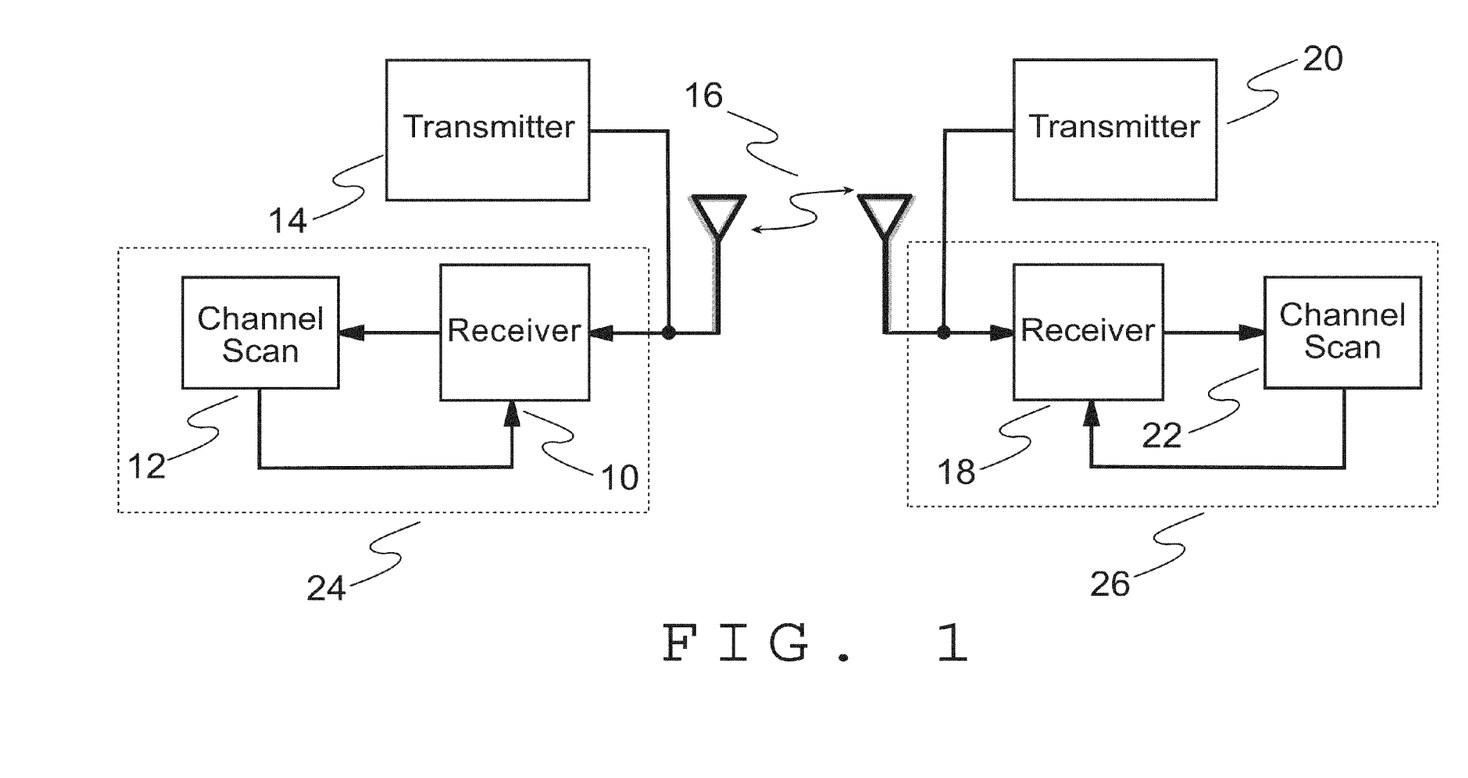
FIG. 1 shows a block diagram of a communications system including a receiver and transmitter, showing the basic operation of the system, how the scan information is transferred back and forth, and how the network must be coordinated so that scans can take place.

FIG. 1 shows a simple, two transceiver (sometimes called "peer-to-peer") radio network. Each transceiver consists of a transmitter (14, 20) and receiver (10, 18) section, as well as a channel scan (12, 22) block. The channel scan block (12, 22) can be separate circuitry or contain pieces that are an integral part of the receiver (10, 18). The job of the channel scan block is to periodically scan the band of operation of the transceiver, and produce data which is shows the amount of power seen at each frequency for all frequencies in the band of operation of the transceiver.

When a scan is to take place, coordination between transceivers must occur across the wireless channel (16). At a prescribed time, both transmitter sections of each transceiver (14, 20) shut off to allow both channel scanners (12, 22) to perform their frequency sweep of the radio channel. When this is complete, regular communications can resume, and, at some point, each transceiver will transmit its scan information across the wireless channel (16) to the other. In this way, both transceivers will have a copy of the channel seen by the other transceiver.

Figure 2:
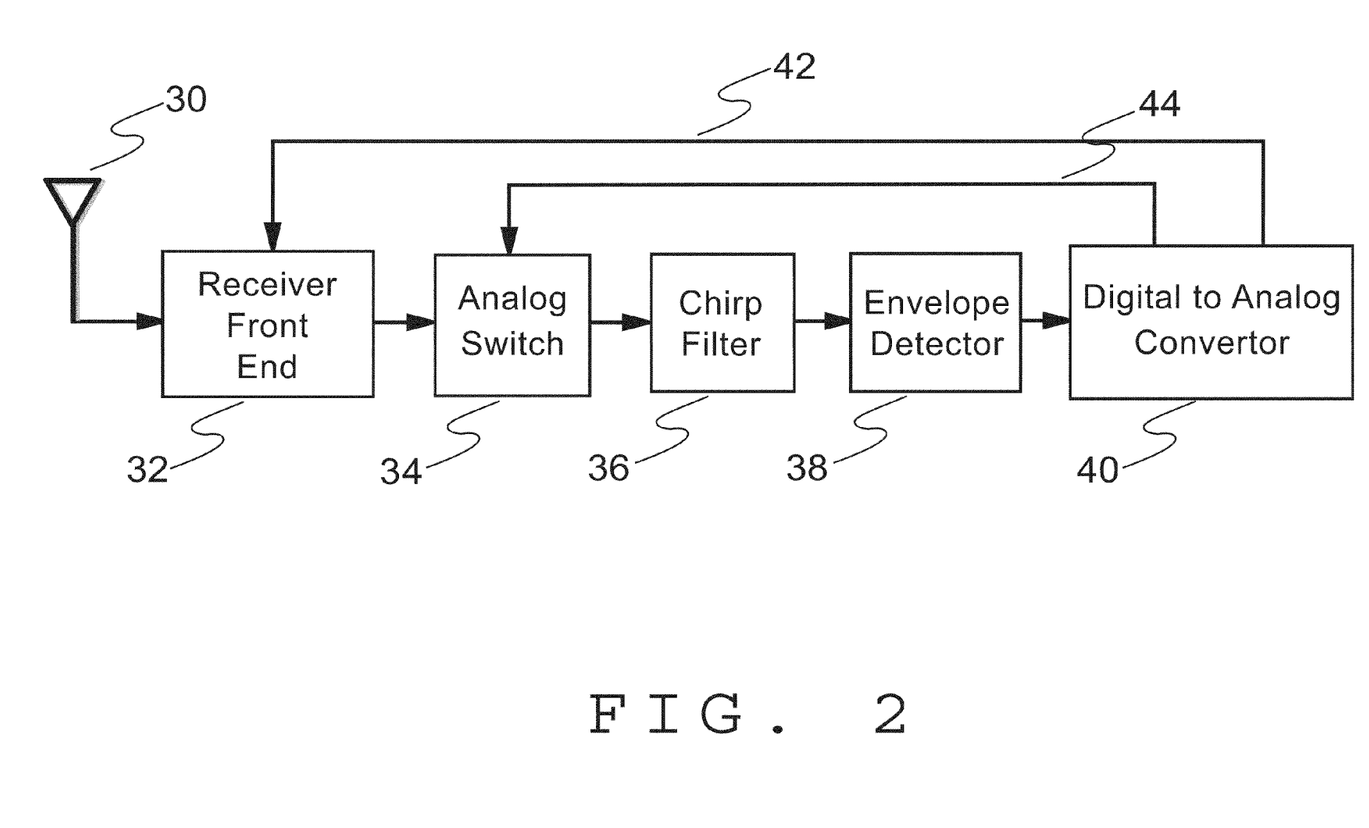
FIG. 2 shows a block diagram of the basic hardware configuration of the measurement portion of a system and apparatus for dealing with interference in a radio network, which uses a dispersive filter to convert the frequency band of operation to information which can be read by a digital-to-analog converter.

FIG. 2 shows a block diagram of the detail of the channel scan block (12) from FIG. 1. This block also contains elements of the receiver block (10). The wireless signal is first picked up by the antenna (30) and fed into the receiver front end (32) which amplifies the signal and converts its centre frequency from the transmission frequency to the receiver's Intermediate Frequency (IF). The gain of the receiver front end (32) is controlled by a control line from the baseband portion of the radio (42). The signal at the receiver's IF is fed into an analog switch (34). It is the job of the analog switch to reduce the duty cycle of the incoming IF signal to a time interval which is close to the sample time of the analog-to-digital converter (40). The analog switch is held on during normal transmission and reception of data, and is only switched during the channel scan. Control of the analog switch (44) is also done by the baseband section.

The duty-cycled IF signal is then fed into a chirp (i.e. dispersive) filter, (36). The action of this chirp filter is to spread the frequency components of the duty-cycled signal out in time, effectively performing a Fourier transform on the signal (i.e. converting the signal from the frequency domain to the time domain). The output of the chirp filter (36) is fed into an envelope detector (38) which converts RF power in the signal to a proportional DC voltage, independent of the frequency of the signal. This voltage is then read by the digital-to-analog converter (40) which converts the voltage into a digital signal which can be stored by the system. In this way, the input RF signal is converted to a frequency scan of the band of operation.

Figure 3:
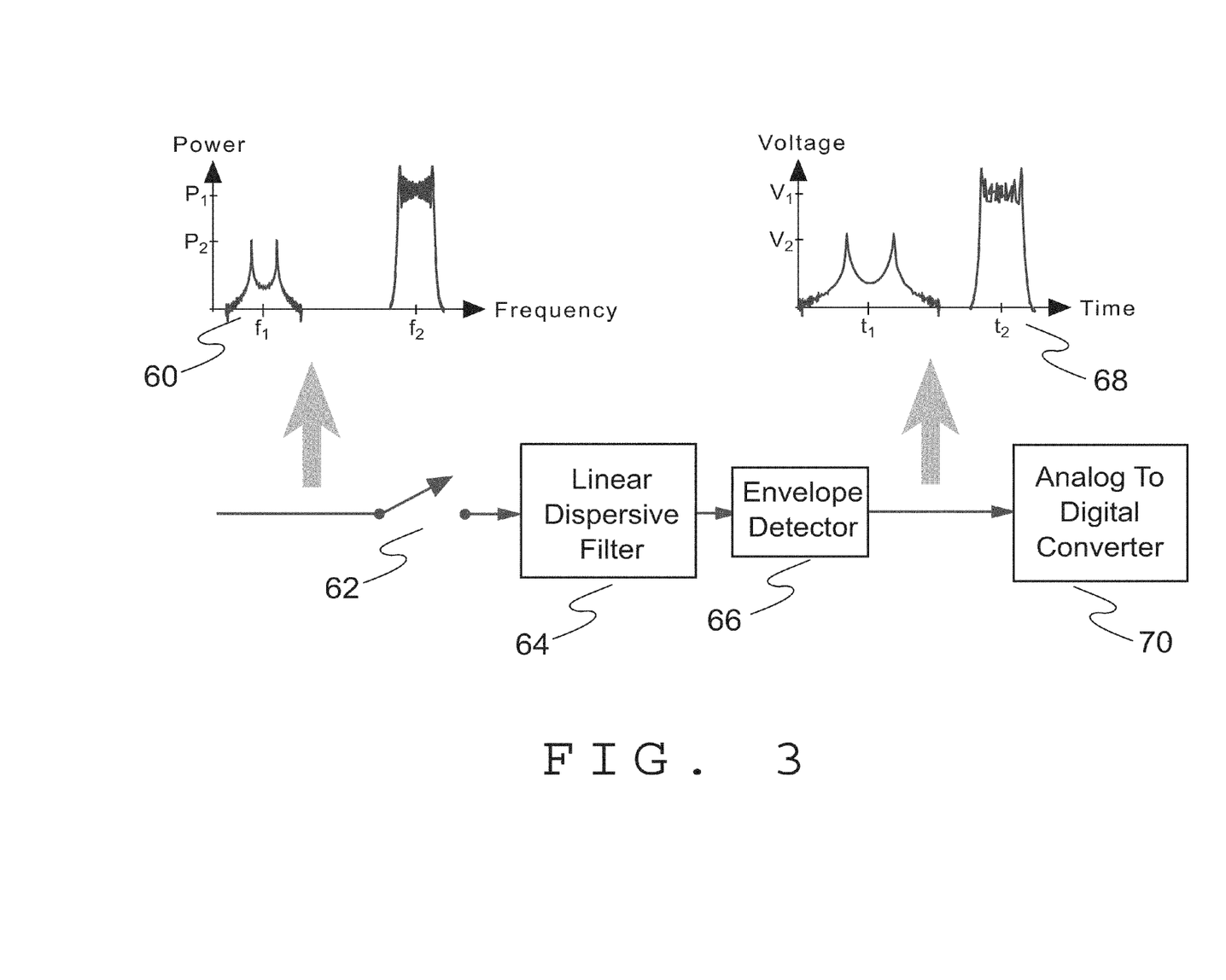
FIG. 3 shows the response of a linear dispersive (i.e. chirp) filter, and how that filter converts the frequency scan information to the time domain.

FIG. 3 shows a detailed description of how the channel scan block converts the incoming RF signal into a frequency scan. The incoming signal at the radio's intermediate frequency (IF) consists of a combination of many signals at different frequencies and at different power levels (60). This signal is first passed through an RF switch (62) which shortens its duty cycle so that its duration is on the order of the sample time of the analog-to-digital converter (70). This is an important step because it ensures that different frequencies will not overlap in the output when sampled by the analog-to-digital converter (70). If the IF signal were not duty-cycled, then all the frequency components seen by the analog-to-digital converter would overlap, and the signal produced would not have the desired frequency-versus-time relationship.

After duty cycling, the signal is then passed through a dispersive filter (64) which has a linear group delay function. This linear group delay function adds a delay in proportion to the frequency of the signal applied at the input of the filter. Thus, for the input signal shown (60), the signal seen at $f_1$ would have a time delay $t_1$ applied to it, and the signal seen at $f_2$ would have a time delay $t_2$ applied to it. There will also be some insertion loss incurred through the filter. At the output of the dispersive filter (64), signals with various time delays and various centre frequencies are seen. From here the signal is applied to the envelope detector (66) which removes the frequency offset of the various signals and demodulates them down to baseband. Thus at the output of the envelope detector (66) a time varying voltage whose amplitude is proportional to the power of the input signal is seen. This signal also scans from one end of the bandwidth of the dispersive filter to the other over time. Thus a frequency sweep whose voltage is proportional to the input signal power has been produced.

The output of the envelope detector (66) is applied to an analog-to-digital converter (70) which produces a digitally sampled copy of the frequency sweep. That way, the signal can be transmitted to other transceivers in the network, or simply stored in the transceiver and used to make intelligent decisions about its radio communications.

Figure 4:
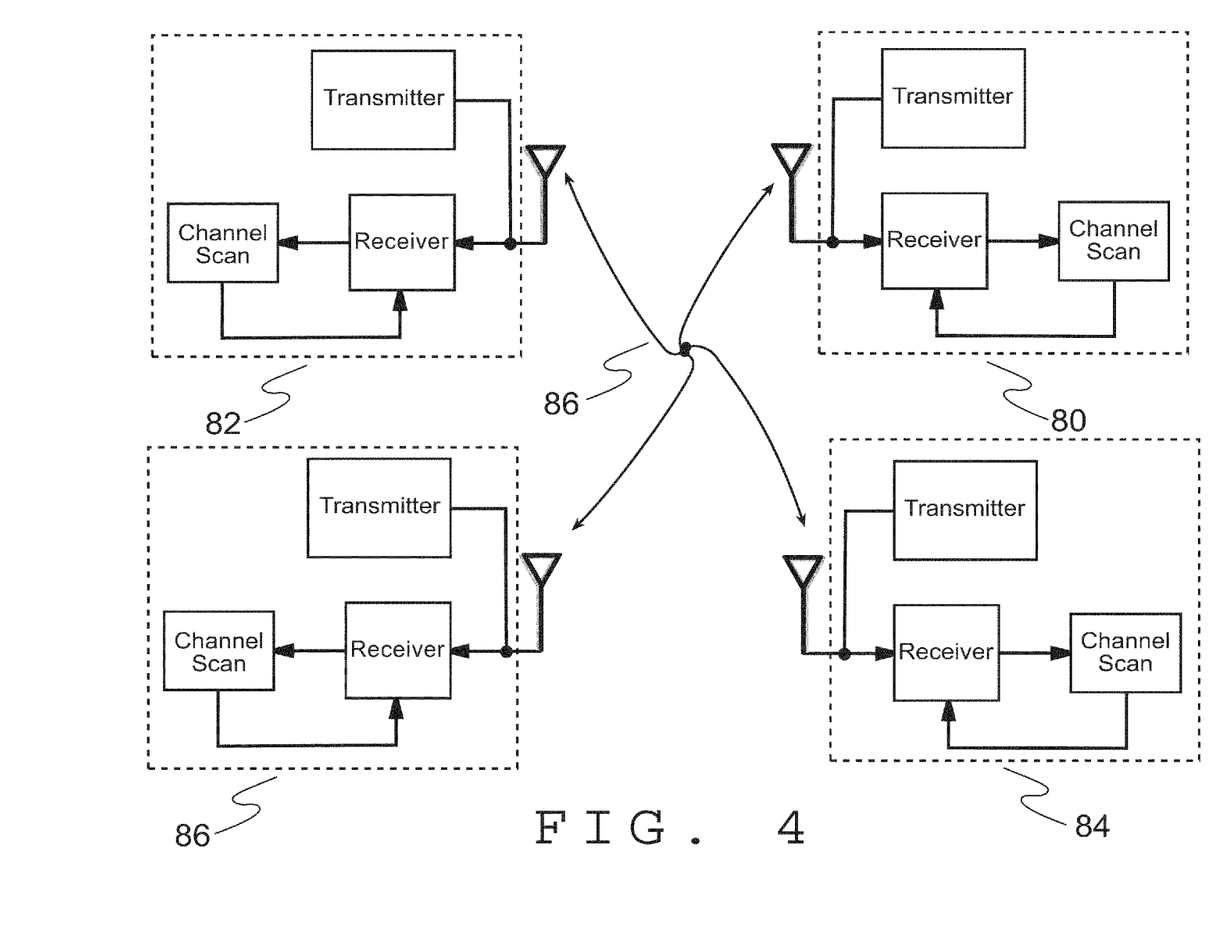
FIG. 4 shows a communications network consisting of multiple transceivers, where the scans are coordinated in the entire network, and each transceiver broadcasts its scan to the other transceivers in the network.

FIG. 4 shows a network of transceivers which are all completing local channel scans and transmitting the information to each other over a shared wireless channel (86). One of the transceivers (82) is designated as the coordinator and controls the behavior of all the other transceivers (80, 86, 84) sharing the wireless channel (86). When the network determines that a scan of the radio channel is to be made, the coordinator (82) signals the other transceivers (80, 86, 84) to not transmit so that the wireless channel (86) will be quiet and only contain interfering signals. During this quiet time, all transceivers will scan the radio channel and obtain local channel scans information. Once this is achieved, each transceiver will in turn share its scan information with all the other transceivers so that radio reception can be optimized.

Figure 5:
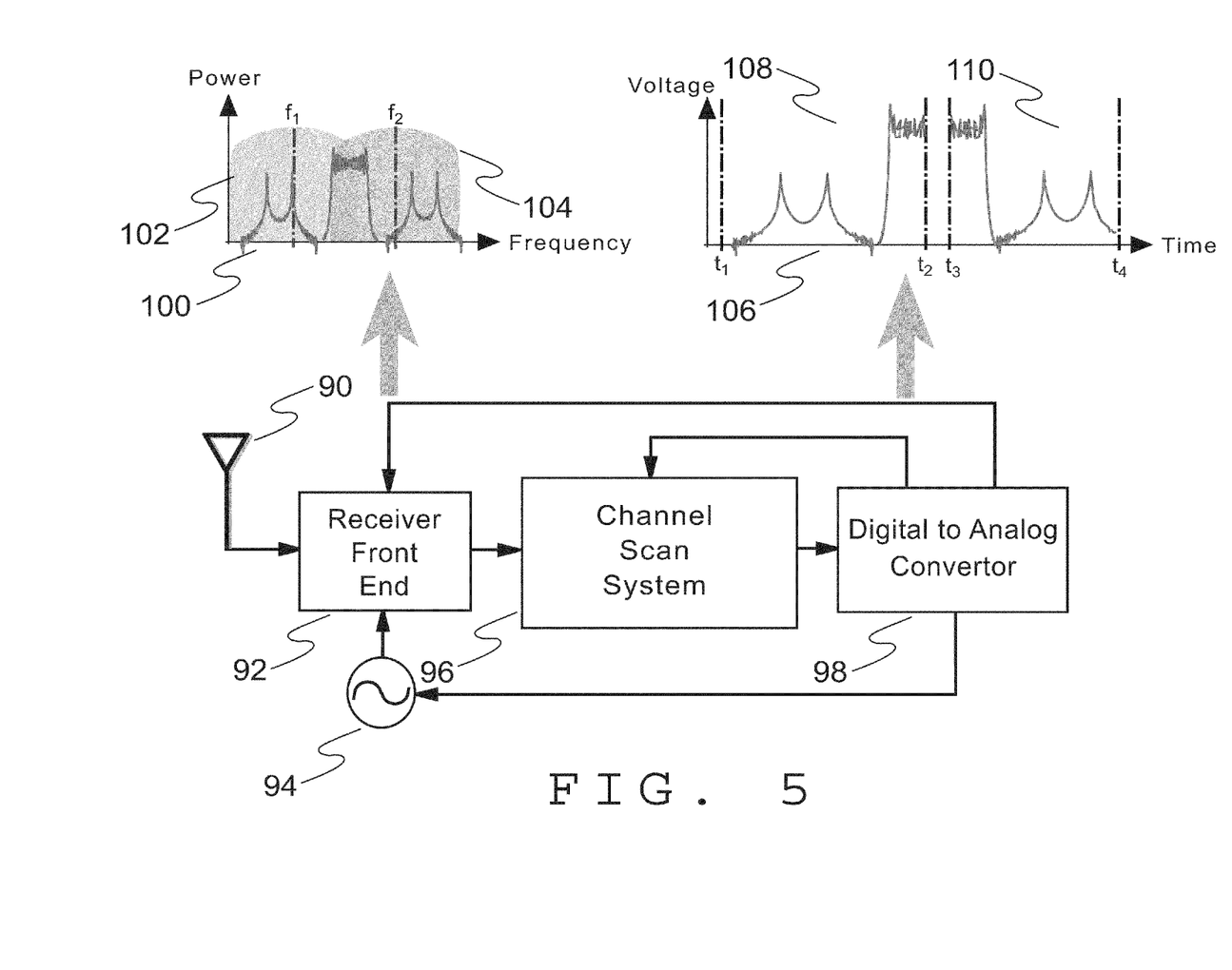
FIG. 5 shows the block diagram of a transceiver in which the bandwidth of the dispersive filter is smaller than the desired scan bandwidth and the transceiver completes multiple scans at different centre frequencies and assembles them to produce a scan over a larger frequency range.

FIG. 5 shows a channel scan block in which the frequency band to be scanned is larger than the bandwidth of the dispersive filter. In this case, the channel scanner is designed to take multiple scans over a large frequency band and combine them together, to create a scan over a large band. The signal coming into the antenna (90) covers a band which is too large for the dispersive filter to cover at one time (100). The solution is to cover the band in two passes, one with a centre frequency of $f_1$ (102) and one with a centre frequency of $f_2$ (104). The two bands may be overlapping, as is the case in FIG. 5, or not.

The procedure for completing multiple overlapping scans is as follows. The centre frequency of the first scan (102), is set by the receiver front end Voltage Controlled Oscillator (VCO) (94) to f1. The channel scanner produces a scan from t1 to t2 (108) at the digital-to-analog converter (98). After this first scan is complete, the receiver front end VCO is tuned to f2, the centre of the second scan (104). After the channel scan system (96) completes the scan, the signal from t3 to t4 appears at the input to the digital-to-analog converter (98). The system can now combine these two scans to create a scan over a band which is much larger than the bandwidth of the dispersive filter. In this way, a band of arbitrary bandwidth can be scanned by the system over a very short period of time.

Operation of the methods disclosed here produce a profile of the band of operation that shows the relationship between each frequency and the amount of interference power at that frequency. This relationship may be used to identify a portion of the band of operation to transmit on in preference to other portions, such as a portion with lower or lowest interference. A transceiver may also send this information to some or all the other transceivers on the network, or transceivers in a specific group or locality, so that multiple transceivers on the network know the interference profile of other transceivers. When each transceiver knows the interference profile of other users, the transceivers may coordinate transmissions to reduce interference.

Since the nature of the interfering signals is not known a priori, and some interferers could change their characteristics (i.e. centre frequencies, power, etc.) often, it would be advantageous for the radio to perform this frequency measurement regularly and over a very short period of time. A tabulation may then be kept of the dynamic behavior of the interferers and this may be checked against known radio standards. Once identified, predictive algorithms may be used to estimate some of the future behavior of the interferers, further enhancing the radio's performance.

Thus, a radio having the ability to produce a plot of frequency versus interference power for its band of operation is a useful feature in an operating network. Furthermore, for such a system to be practical, this measurement ability should be a basic function of the radio without adding much complexity or severely increasing power consumption. What is disclosed here is a technique for performing this measurement function which meets those criteria.

Immaterial modifications may be made to the embodiments described here without departing from what is covered by the claims. In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

What is claimed is:

1. A method of operating a radio system including a transmitter and a receiver and operating over at least a first range of frequencies in a band of operation, the method comprising:
    receiving a radio signal at a receiver, the radio signal including frequencies in the band of operation;
    obtaining a time limited segment of the signal to produce a pulse;
    spreading frequency components of the pulse out in time to produce a chirp;

measuring the amplitude of the chirp over time to determine the magnitudes of at least some of the frequency components spread out in time of the pulse;

determining information about the frequency spectrum of the band of operation using the determined magnitudes of frequency components of the pulse;

conveying at least a portion of the information about the frequency spectrum of the band of operation from the receiver to the transmitter; and using the at least a portion of the information about the frequency spectrum of the band of operation to control how the transmitter makes transmissions; wherein at least a second time limited segment is obtained to produce at least a second pulse, and frequency components of the at least a second pulse are spread out in time to produce at least a second chirp, and the amplitude of the at least a second chirp is measured over time to determine magnitudes of at least some of the frequency components spread out in time of the at least a second pulse, wherein the frequency components whose magnitude are determined of the pulse occur over a second range of frequencies and the frequency components whose magnitude is determined of the at least a second pulse occur over at least a third range of frequencies different from the second range of frequencies, and information about the frequency spectrum of the band of operation in the second range of frequencies is determined using the determined magnitudes of frequency components of the pulse and information about the frequency spectrum of the band of operation in the third range of frequencies is determined using the determined magnitudes of frequency components of the at least a second pulse.

2. The method of claim 1 in which the steps of the method are repeated periodically.

3. The method of claim 1 in which the frequency components of the pulse are spread out in time using a dispersive filter.

4. The method of claim 3 in which the dispersive filter is a surface acoustic wave (SAW) filter.

5. The method of claim 1 in which the amplitude of the chirp is measured over time using an envelope detector.

6. The method of claim 5 in which the envelope detector is a received signal strength indicator (RSSI circuit).

7. The method of claim 5 in which the output of the envelope detector is digitized using an analog-to-digital converter (ADC).

8. The method of claim 1 in which the time limited segment of the signal is obtained using a switch.

9. The method of claim 1 in which a voltage controlled oscillator (VCO) in the receiver is tuned to a first frequency at the time of the pulse and to at least a second frequency different from the first frequency at the time or respective times of the at least a second pulse.

10. The method of claim 1 in which the receiver and transmitter are synchronized so that that the transmitter does not transmit when information about the frequency spectrum of the band of operation is being determined.

11. The method of claim 1 in which the transmitter transmits within a time-varying channel comprising a channel range of the frequencies of the radio band, and the receiver measures a frequency spectrum of a measuring range of frequencies of the radio band larger than the channel range of frequencies of the radio band.

12. The method of claim 1 in which the transmitter transmits within a time-varying channel within the first range of frequencies, and the control of how the transmitter makes transmissions includes control of the frequency of the time-varying channel.

13. The method of claim 1 in which the transmitter transmits periodically, and the control of how the transmitter makes transmissions includes control of which time periods the transmitter transmits in.

14. The method of claim 1 in which the radio system includes a plurality of transceivers, each containing a transmitter and receiver in which each receiver of the plurality of transceivers measures a frequency spectrum of a range of frequencies in the band of operation as seen by the receiver and conveys information about the frequency spectrum of a range of frequencies in the band of operation as seen by the receiver to other transceivers in the system and the other transceivers use this information to control how the transmitters of the transceivers make transmissions.

15. The method of claim 14 in which all the transceivers are synchronized, so that no transceiver is transmitting a signal when any transceiver is measuring a frequency spectrum.

16. The method of claim 14 in which each respective transmitter transmits within a respective time-varying channel within the band of operation, and each respective receiver measures a respective frequency spectrum of a respective range of frequencies of the band of operation larger than any of the time-varying channels.

17. A radio system operating over at least a first range of frequencies in a band of operation, the radio system comprising:
   a transmitter;
   a receiver, the receiver configured to receive a radio signal including frequencies of the radio band;
   a sampling element for obtaining a time limited segment of the radio signal to produce a pulse;
   a time-spreading element for spreading frequency components of the pulse out over time to produce a chirp;
   a measurement unit for measuring the amplitude of the chirp over time to determine magnitudes of the frequency components spread out over time of the pulse; and
   in which the receiver is configured to determine information about the frequency spectrum of the band of operation using the determined magnitudes of frequency components of the pulse and convey at least a portion of the information about the frequency spectrum of the band of operation from the receiver to the transmitter, and the transmitter is configured to use the at least a portion of the information about the frequency spectrum of the band of operation to control how the transmitter makes transmissions; wherein at least a second time limited segment is obtained to produce at least a second pulse, and frequency components of the at least a second pulse are spread out in time to produce at least a second chirp, and the amplitude of the at least a second chirp is measured over time to determine magnitudes of at least some of the frequency components spread out in time of the at least a second pulse, wherein the frequency components whose magnitude are determined of the pulse occur over a second range of frequencies and the frequency components whose magnitude is determined of the at least a second pulse occur over at least a third range of frequencies different from the second range of frequencies, and information about the frequency spectrum of the band of operation in the second range of frequencies is determined using the determined magnitudes of frequency components of the pulse and information about the frequency spectrum of the band of operation in the third range of frequencies is determined using the determined magnitudes of frequency components of the at least a second pulse.

18. The radio system of claim 17 in which the radio system is configured to periodically determine information about the frequency spectrum of the band of operation at the receiver and convey at least a portion of the information about the frequency spectrum of the band of operation from the receiver to the transmitter.

19. The radio system of claim 17 in which the time-spreading element is a dispersive filter.

20. The radio system of claim 19 in which the dispersive filter is a surface acoustic wave (SAW) filter.

21. The radio system of claim 17 in which the measurement unit comprises an envelope detector.

22. The radio system of claim 21 in which the envelope detector is a received signal strength indicator (RSSI circuit).

23. The radio system of claim 21 in which the measurement unit also comprises an analog-to-digital converter (ADC) for digitizing the output of the envelope detector.

24. The radio system of claim 17 in which the sampling element is a switch.

25. The radio system of claim 17 also comprising a frequency tuning element to control a range of frequencies that are spread out by the time-spreading element.

26. The radio system of claim 25 in which the range of frequencies is smaller than the radio band, and the range of frequencies can be controlled such that frequency components of plural pulses can be measured to determine an overall frequency spectrum.

27. The radio system of claim 17 in which the receiver and transmitter are configured to be synchronized so that that the transmitter does not transmit when information about the frequency spectrum of the band of operation is being determined.

28. The radio system of claim 17 in which the transmitter is configured to transmit within a time-varying channel comprising a channel range of the frequencies of the radio band, and the receiver is configured to measure a frequency spectrum of a measuring range of frequencies of the radio band larger than the channel range of frequencies of the radio band.

29. The radio system of claim 17 in which the transmitter is configured to transmit within a time-varying channel within the first range of frequencies, and the control of how the transmitter makes transmissions includes control of the frequency of the time-varying channel.

30. The radio system of claim 17 in which the transmitter is configured to transmit periodically, and the control of how the transmitter makes transmissions includes control of which time periods the transmitter transmits in.

31. The radio system of claim 17 in which the radio system includes a plurality of transceivers, each containing a transmitter and a receiver, in which each receiver of the plurality of transceivers is configured to measure a frequency spectrum of a range of frequencies in the band of operation as seen by the receiver and convey information about the frequency spectrum of a range of frequencies in the band of operation as seen by the receiver to other transceivers in the system and the other transceivers are configured to use this information to control how the transmitters of the transceivers make transmissions.

32. The radio system of claim 31 in which all the transceivers are configured to be synchronized, so that no transceiver is transmitting a signal when any transceiver is measuring a frequency spectrum.

33. The radio system of claim 31 in which each respective transmitter is configured to transmit within a respective time-varying channel within the band of operation, and each respective receiver is configured to measure a respective frequency spectrum of a respective range of frequencies of the radio band larger than any of the time-varying channels.

* * * * *